Jan. 18, 1955 V. O. BOWLES 2,699,929
LIGHTWEIGHT FRACTIONATING TRAY
Filed April 30, 1953 4 Sheets-Sheet 1
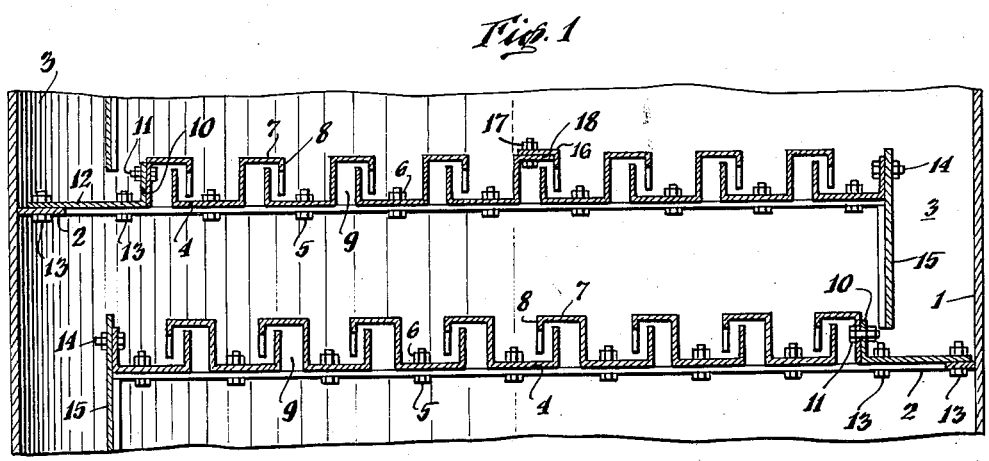
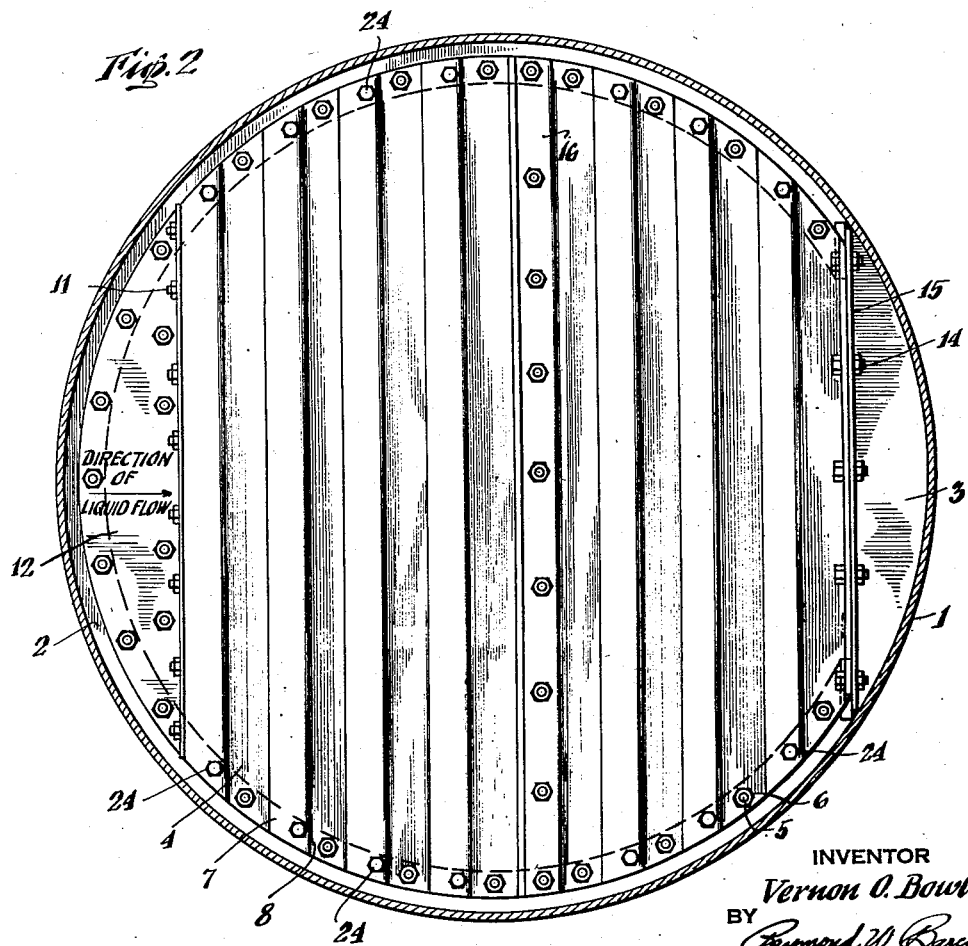
INVENTOR
Vernon O. Bowles
BY
ATTORNEY Jan. 18, 1955  V. O. BOWLES  2,699,929
LIGHTWEIGHT FRACTIONATING TRAY
Filed April 30, 1953  4 Sheets-Sheet 2
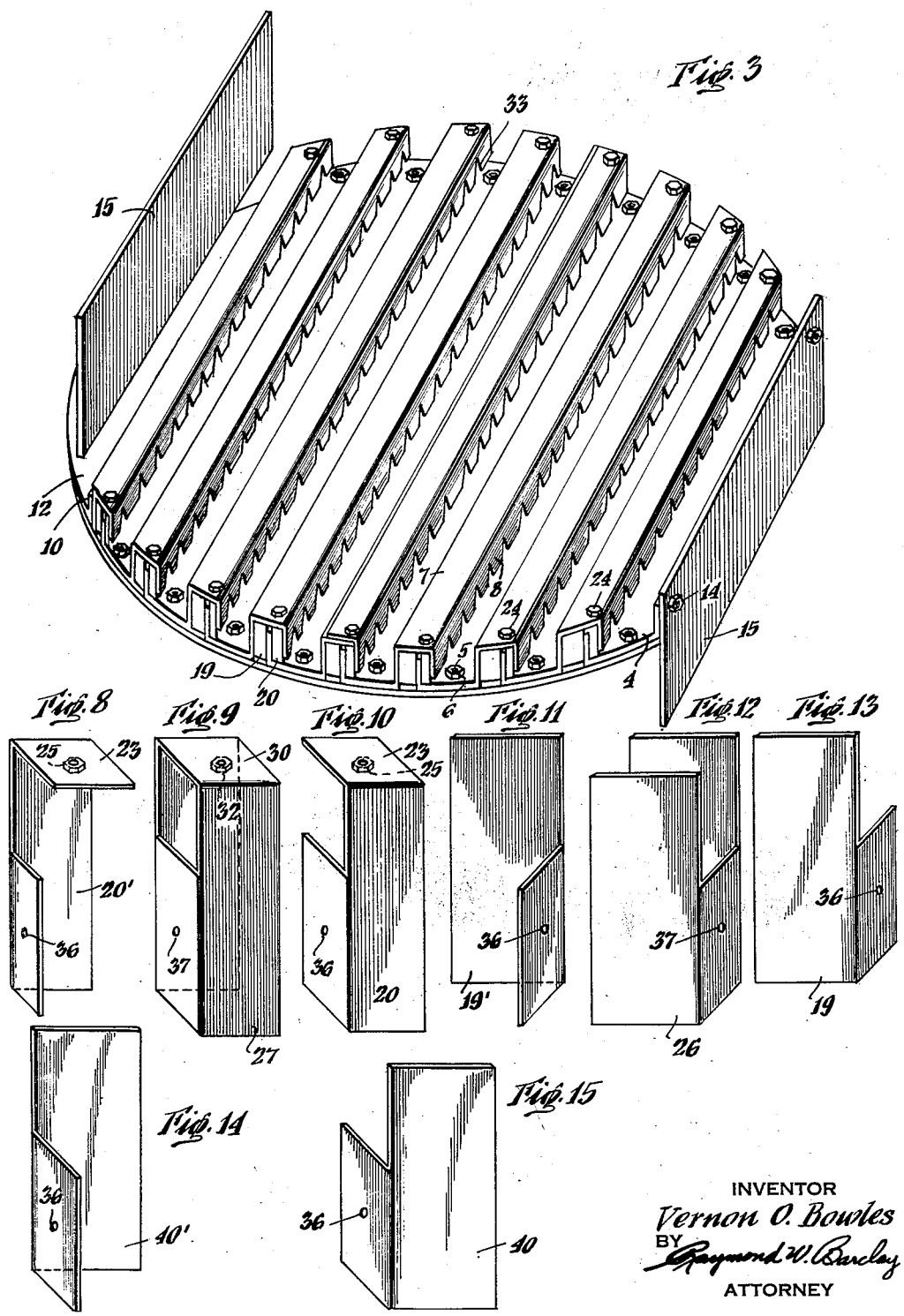
INVENTOR
Vernon O. Bowles
BY
Raymond W. Barclay
ATTORNEY Jan. 18, 1955 V. O. BOWLES 2,699,929
LIGHTWEIGHT FRACTIONATING TRAY
Filed April 30, 1953 4 Sheets-Sheet 3
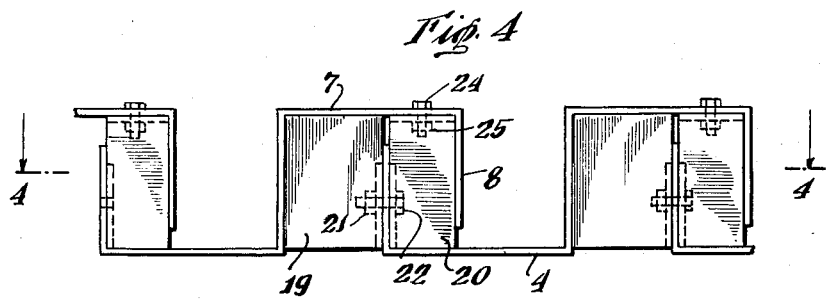
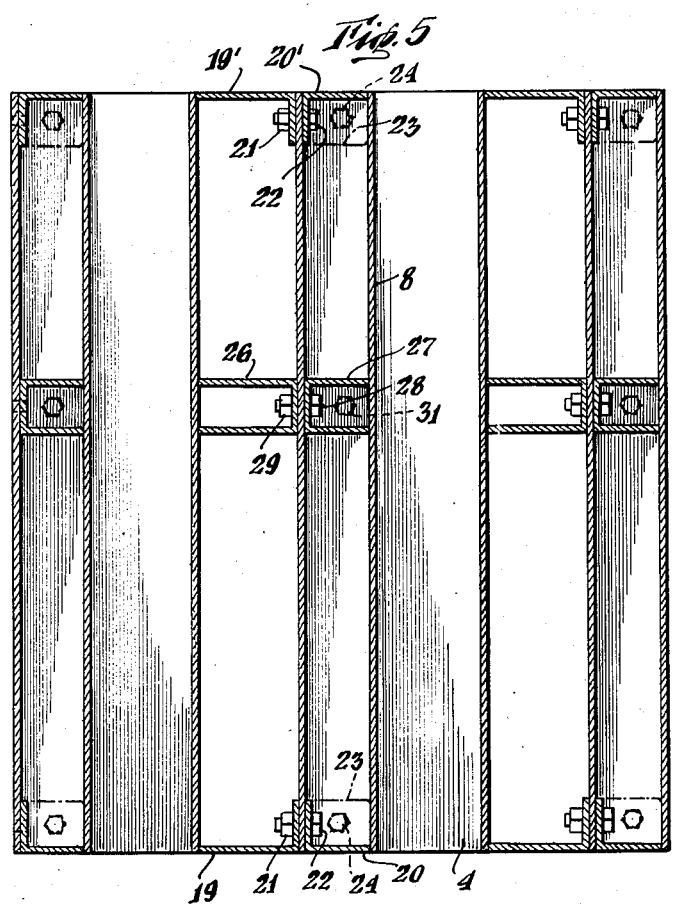
INVENTOR
Vernon O. Bowles
BY
ATTORNEY Jan. 18, 1955  V. O. BOWLES  2,699,929
LIGHTWEIGHT FRACTIONATING TRAY
Filed April 30, 1953  4 Sheets-Sheet 4
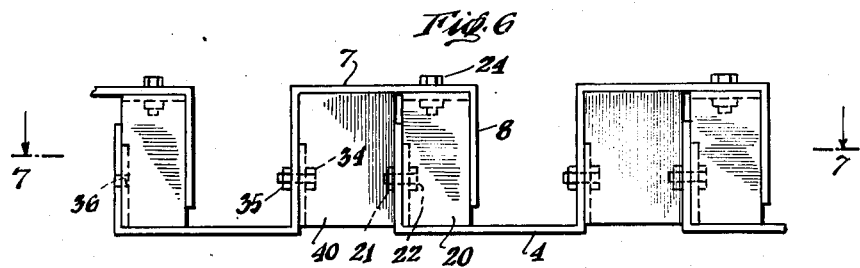
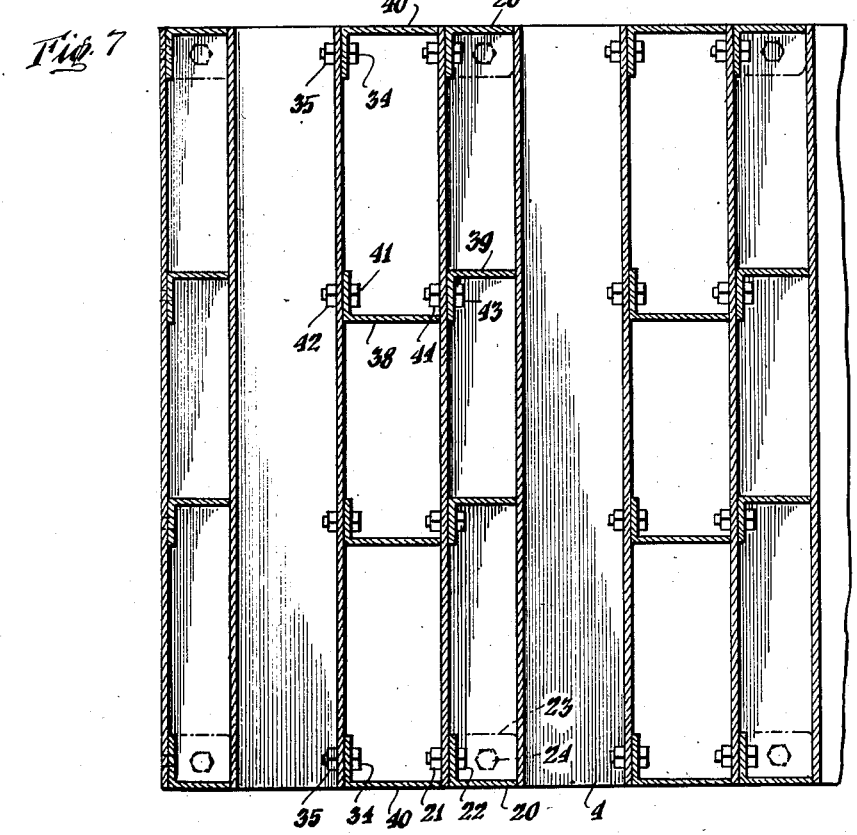
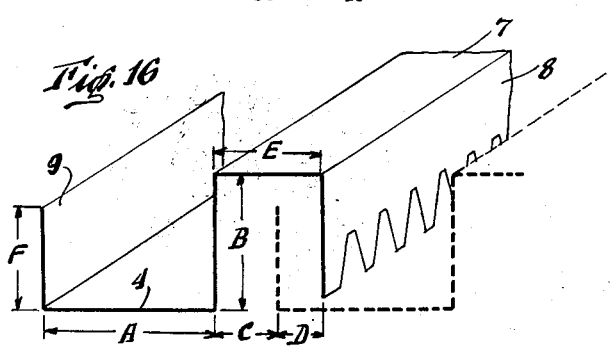
INVENTOR
*Vernon O. Bowles*
BY
*Raymond W. Barclay*
ATTORNEY

United States Patent Office

2,699,929
Patented Jan. 18, 1955

2,699,929

LIGHTWEIGHT FRACTIONATING TRAY

Vernon O. Bowles, Rye, N. Y., assignor to Socony-Vacuum Oil Company, Incorporated, a corporation of New York Application April 30, 1953, Serial No. 352,097

10 Claims. (Cl. 261—114)

The present invention relates to an improvement in fractionating towers and particularly to the trays used therein in which a gas passes through a liquid. This application is a continuation-in-part of my co-pending application, Serial No. 326,481, filed December 17, 1952, which, in turn, is a continuation-in-part of my application, Serial No. 186,860, filed September 26, 1950.

Fractionating towers of the type conventionally employed in the refining industries for fractionating hydrocarbon liquids and the like have heretofore generally been constructed by mounting a plurality of rigid horizontal plates at various elevations within a cylindrical tank. These horizontal plates are ordinarily pierced by a plurality of orifices over which are placed bubble caps so that vapors rising in the tower pass up through the orifices and bubble down into the liquid on the plate. The downwardly flowing liquid passes from plate to plate by means of downcomers to afford contact between vapor and liquid at a number of various levels as determined by the relative position of the horizontal plates or bubble trays.

The trays of the bubble cap type of tower are usually constructed of metal and supported by annular flanges spaced along the outer edge of the trays and secured to the inside wall of the tank. To afford the necessary rigidity and strength, the trays must be constructed of relatively thick metal plate and must frequently have supporting beams to avoid deflection of the plate. As generally recognized, the maintenance, and particularly the cleaning, of bubble cap type trays is cumbersome. It is, for example, well known that, during fractionation of petroleum hydrocarbons, a gummy or carbonaceous deposition frequently takes place on the plates due to polymerization, coking, and the action of sulfur compounds and other agents. The cleaning of bubble cap plates made up of numerous bubble caps, risers, and associated fastenings in such instances is a tedious operation, accomplished only at the expenditure of considerable time and labor. Furthermore, while the trays are preferably constructed of a corrosion-resistant metal such as stainless steel, the cost of fabricating a tray of such material having sufficient thickness, together with supporting beams to provide the necessary rigidity and strength, has heretofore been an expensive proposition. Common practice has been to construct trays of less expensive material such as cast iron or steel. A tray fabricated from such metals affords the necessary thickness in construction at a comparatively reasonable cost, but such trays are heavy and are unsatisfactory when liquid and vapors coming in contact therewith are of a corrosive nature. Corrosion of the trays necessitates frequent replacement or repair thereof which, as pointed out hereinabove, is not only an expensive proposition but a laborious and time-consuming operation due to the complexity of design and to the weight of the heavy metal parts used in fabrication. Thus, economics often dictate that the fractionating tray be constructed of corrosion-resistant alloy regardless of initial cost.

It is an object of the present invention to overcome the aforesaid disadvantages in fractionating tray construction and to provide a fractionating tower wherein a corrosion-resistant metal can be employed in relatively thin sections for fabrication of the tray.

A further object is the provision of a fractionating tray wherein the functional members making up said tray serve as lightweight structural beams extending transversely across the tank, thereby permitting construction of a comparatively light tray which is easy to fabricate, assemble, and maintain in operation.

A still further object of this invention is to provide a fractionating tray of sections having inherent structural strength and simple design so that both the cost of fabrication in the shop and installation in the field is minimized and therefore to afford a tray which can be installed at less cost than other types of fractionating trays presently in use.

A very important object of this invention is the provision of a fractionating tray having interlocking functional and structural members afforded by the presence of angular closure plates affixed to either end of said members and angular stiffening plates affixed thereto at intermediate points.

A fractionating tray construction designed to fulfill the aforesaid objects is hereinafter described, together with other features of the invention.

The invention will be more readily understood by reference to the accompanying drawings wherein:

Figure 1 is an elevational view partly in section of a portion of a fractionating tower showing trays constructed in accordance with the invention.

Figure 2 is a plan view of a fractionating tray embodying one form of the invention.

Figure 3 is an isometric view showing a fractionating tray with angular end closure plates.

Figure 4 is an enlarged elevational view showing a fractionating tray with angular end closure plates and the manner of interlocking of adjacent members.

Figure 5 is a view of a section along the line 4 of the fractionating tray shown in Figure 4.

Figure 6 is an enlarged elevational view similar to Figure 4 but showing an alternate means of affixing the angular end plates.

Figure 7 is a view of a section along the line 7 of the fractionating tray shown in Figure 6.

Figure 8 is an enlarged view of angular end plate 20'.

Figure 9 is an enlarged view of intermediate stiffening plate 27.

Figure 10 is an enlarged view of angular end plate 20.

Figure 11 is an enlarged view of angular end plate 19'.

Figure 12 is an enlarged view of intermediate stiffening plate 26.

Figure 13 is an enlarged view of angular end plate 19.

Figure 14 is an enlarged view of angular end plate 40'.

Figure 15 is an enlarged view of angular end plate 40.

Figure 16 is an enlarged isometric view of the members which make up the fractionating tray.

Referring more particularly to the drawings, in which like reference characters denote like parts, 1 designates an elongated cylindrical tank which forms the shell of the fractionating tower. Since the tank may be of any desired height and diameter, only a portion thereof is shown. A plurality of trays is mounted at various elevations throughout the tank, the number of said trays depending upon the requirements of the fractionation to be performed. While only two trays have been shown in Figure 1, it will be understood that additional trays may be positioned above and below the particular set of trays illustrated. A plurality of support rings 2 is welded or otherwise secured to the inside wall of tank 1. Resting upon and affixed to each support ring are the members which make up the fractionating tray. Adjacent to each group of horizontal trays are downcomers 3, through which liquid passes. Each downcomer is sealed by the level of liquid on the tray below, thus preventing the upward passage of vapors therethrough.

The invention as set forth hereinabove is particularly directed to the construction, design, and mounting of the fractionating trays. The trays, as will be seen, are composed of a series of troughs 4 spaced at uniform intervals transversely across the tank and positioned in co-planar relationship one with the other. Each of the troughs is secured to the support ring 2 by suitable fastening means such as bolts 5 held in position by nuts 6. The vertical walls of each of the troughs are positioned at substantially right angles to the respective trough bottoms. However, said walls may vary from the vertical as much as 30° without affecting the functional property thereof, it being understood that the individual troughs in a given tray are preferably of the same design.

To each trough is attached an L-shaped section composed of a horizontal leg 7 attached to the downstream edge of the trough and a vertical leg 8, the lower edge of which is serrated. The aforementioned L-shaped section overhangs into the next succeeding trough, thereby providing a passage 9 between each pair of adjacent troughs. The L-shaped section overhanging the upstream trough of each tray is attached to a vertical plate 10 which, in turn, is affixed by suitable fastening means, such as bolts 11, to angle support plate 12, the horizontal extension of the latter being contiguous with and affixed to support ring 2 by bolts 13. The downstream wall of the trough terminating each tray section is affixed by bolts 14 to plate 15 which extends vertically below the horizontal level of said trough to a point sufficient to effect an adequate vapor seal. This may be accomplished by extending plate 15 downwardly to a point sufficiently above plate 12 of the next lower tray so that liquid can easily flow thereunder but sufficiently below the top of vertical plate 10 of said lower tray to provide a vapor seal. When the liquid flow is very large, plate 10 is desirably vertically extended to provide an adequate vapor seal. Access between trays for maintenance or repair can be obtained by simply removing a few tray sections. For such purpose, it is desirable to facilitate vertical entry through the tray sections by providing alternate trays with a removabe L-shaped section 16 which is fastened by bolt 17 or other suitable means to plate 18. Access into the tray section, when desired, can then be gained by effecting removal of section 16 and the remaining downstream troughs making up the tray. An appropriate number of the upstream troughs of the next lower tray can then easily be removed and likewise alternate groups of downstream and upstream troughs of succeeding levels of trays may be removed until the desired point of entry is attained.

The downcomers are staggered on alternate trays in such manner as to cause a back-and-forth travel of liquid in a horizontal direction across each successive tray in addition to the vertical flow from tray to tray. The horizontal flow of liquid across each tray is caused by vapor impact compensating for the hydraulic gradient between the point where liquid enters the tray and the point where it leaves the tray. Thus, the vapors being contacted issue in the same direction as liquid flow across the tray and the impinging action of the vapors serves to move the liquid across each tray and thereby compensates for the hydraulic gradient. The vertical plate 10 of each tray is affixed through support plate 12 to support ring 2 in such manner that it is substantially perpendicular to the flow of liquid proceeding across each tray after the same has entered the tray through downcomer 3. Likewise, since the vertical walls of each of the L-shaped sections are parallel to vertical plate 10, these members are also located perpendicular to the horizontal flow of liquid across the tray. The result of this perpendicular arrangement of troughs and overhanging L-shaped sections to the line of liquid flow is a rippling effect as the liquid travels across each tray and passes downwardly through the tank. The combination of the rippling effect of the liquid and the bubbling action of the vapors passing therethrough thus affords an intimate degree of contact between vapor and liquid and compensates for the hydraulic gradient required to effect horizontal liquid flow.

Referring to the plan view of the fractionating tray shown in Figure 2, it will be seen that the troughs 4 and overhanging L-shaped sections made up of legs 7 and 8 extend transversely across tank 1. End closure of the area encompassed by the overhanging L-shaped sections and the vertical trough walls to which said sections are attached is effected by plates 19, 19', 20, and 20' as particularly shown in Figures 3, 4, and 5. These plates are angular in form, one wall thereof serving to effect end closure of a designated portion of the aforesaid area and the other wall thereof being contiguous with and affixed to the upstream wall of the adjacent downstream trough. The angle between walls comprising said plates may be substantially a right angle as shown in Figure 5 or may, depending upon the contour of the members making up the tray of which it is desired to effect end closure, vary from a right angle by as much as 45°. Plates 19, 19', 20, and 20' are attached by spot welding or by suitable fastening means, such as bolts 22 and nuts 21, to the adjacent upstream trough wall with which these plates are contiguous. The walls of the plates which are contiguous with the adjacent upstream trough wall, as well as said wall, are pierced by openings through which said bolts pass and are affixed, serving to impart structural strength to the arranged members. Plates 20 and 20', which serve to effect closure of the space between overhanging leg 8 of the L-shaped sections and the upstream wall of the adjacent and interlocking downstream trough, are preferably provided with tabs 23 which are substantially perpendicular to the end closure wall of these plates and are contiguous with leg 7 of the aforesaid overhanging L-shaped sections. These tabs 23 are affixed to legs 7 by suitable means, for example, bolts 24 and nuts 25, which further serve to impart structural strength to the overall arrangement of interlocking troughs. In addition, the arrangement of interlocking troughs is suitably stiffened by one or more intermediate stiffening plates which may be angular in form similar to the end closure plates or U-shaped, such as plates 26 and 27. These latter plates respectively extend across the space between the downstream wall of the upstream trough and the upstream wall of the adjacent downstream trough and the space between the latter wall and the vertical serrated leg of the overhanging L-shaped section. These intermediate plates serve to stiffen the vertical upstream walls of the trough sections against deflection, particularly in the central portion of the tray. Any desired number of intermediate stiffening plates may be employed, generally positioned on approximately 12 to 30-inch centers. The stiffening plates are pierced by openings through which suitable fastening means, such as bolts 28, provided with nuts 29, pass. Stiffening plates 27 are suitably, but not necessarily, provided with tabs 30 which are parallel to the trough bottoms and contiguous with legs 7 of the overhanging L-shaped sections. Tabs 30 are affixed to legs 7 by suitable means, for example, bolts 31 and nuts 32. While the aforementioned stiffening webs are not generally necessary in trays of small diameter, they greatly improve the overall structural strength of the trays and their use is therefore preferred, particularly in trays of large diameter.

It is to be realized that end closure plates 20 and 20', as well as intermediate stiffening plates 27, will function without top tabs 23 and 30. Also, the top tabs may be used on some of the intermediate stiffening plates and not on others. Generally, it is desirable to employ end closure plates 20 and 20', having top tabs 23 and intermediate stiffening plates 27, in the center portion of the tray, provided with top tabs 30. For example, in an 8-foot tower, end closure plates 20 and 20' would desirably be provided with top tabs 23. Intermediate stiffening plate 27 in the middle of the tower would desirably be provided with top tab 30 while the intermediate stiffening plates between the ends and middle would not necessarily be provided with top tabs.

An isometric view of the fractionating tray of the type described herein is illustrated by Figure 3. The vertical leg 8 of the overhanging L-shaped sections is serrated with the serrations 33 pointing downward and extending into the adjacent downstream trough to provide an effective bubbling means for passing vapor through liquid flowing perpendicularly across the trough. It will further be noted that end closure plates 19, 19', 20, and 20' engage the upstream wall of the adjacent downstream trough and are affixed thereto. During operation, vapors from the tray below pass up through passage 9 between two adjacent troughs over the upstream edge of the downstream trough and then through the serrated edge of leg 8 where vapor bubbles are released into the liquid on this trough.

The arrangement of end closure plates as shown in Figures 4 and 5 affords a fractionating tray of high structural strength. In this arrangement, end closure plates 19, 19', 20, and 20' are affixed to the upstream wall of the adjacent downstream trough by suitable fastening means, such as by bolting each of the end closure plates by means of a single bolt, to the upstream trough wall. End closure plates 20 and 20', as indicated above, are suitably provided with top tabs 23, which tabs are pierced by an opening, the under surface of the tabs surrounding the opening having a nut 25 welded or otherwise affixed thereto. Bolting of the horizontal legs 7 of the overhanging L-shaped sections to the end closure plates 20 and 20' is effected by means of bolts 24 passing through the openings in top tabs 23 and engaging the nut on the under side of said tabs.

Alternate means of affixing the end closure plates is shown in Figures 6 and 7 wherein end closure plates 40 40' are affixed to the downstream wall of the adjacent upstream trough by bolts 34 and nuts 35. In this arrangement, one wall of the plates 40 and 40' serves to effect end closure of the space between the downstream wall of an adjacent upstream trough and the upstream wall of an adjacent downstream trough. Remaining walls of plates 40 and 40' are contiguous with and affixed to the downstream wall of the upstream trough. The walls of the plates which are contiguous with the adjacent downstream trough wall, as well as said wall, are pierced by openings through which bolts 34 pass and are affixed. The arrangement of end closure plates as shown in Figures 6 and 7 is advantageous in that no plate or portion thereof extends beyond the external faces of the trough members, thus affording greater ease in shipping and handling. This arrangement, wherein plates 40 and 40' are affixed to the vapor section and plates 20 and 20' to the trough section further affords a slot which engages and supports vertical upstream walls of the troughs and results in interlocking engagement of the trough members to provide a tray of high structural strength.

The intermediate stiffening plates may alternatively be U-shaped as shown in Figure 5 or may be angular in form similar to the end closure plates. In Figure 7, angular stiffening plates 38 and 39 are shown. Angular plate 38 has one wall contiguous with the downstream wall of the adjacent upstream trough and is affixed thereto by suitable fastening means such as bolts 41 and 42, the remaining wall of plate 38 extending across the space between the downstream wall of the upstream trough and the upstream wall of the adjacent downstream trough. Intermediate stiffening plate 39 has one wall contiguous with the upstream wall of the downstream trough and is affixed thereto by suitable means, such as bolts 43 and nuts 44, the remaining wall of plate 39 extending across the space between the upstream wall of the adjacent downstream trough and the vertical serrated leg of the overhanging L-shaped section.

The angular end closure plates and intermediate stiffening plates are shown in detail by Figures 8 to 15. The end plates, as will be noted, comprise angularly arranged walls, one wall serving to effect end closure of the members making up the fractionating tray and the other wall being contiguous with an adjacent trough wall and pierced by openings 36. Likewise, the U-shaped stiffening plates comprise two walls connected by a third wall, the height of said third wall being not greater than the depth of the troughs and being pierced by openings 37. As indicated hereinabove, the end closure plates may desirably be provided with top tabs 23. Likewise, the intermediate stiffening plates may be provided with top tabs 30.

The width of the troughs 4 is directly related to the slot area; that is, the area of all of the slots in a given tray. Preferred design employs slot area equal to about 8 to about 17 per cent of the total tower cross-section. However, the width of the troughs making up the instant trays may be so established as to attain slot areas ranging from about 5 to about 20 per cent of the total tower cross-section. A related advantage of the present tray construction is the high percentage of riser area attained; that is, the cross-sectional area between the troughs 4 through which the vapors pass upwardly. Existing bubble cap trays achieve riser areas ranging from 6 to 15 per cent whereas the instantly described tray achieves a riser area of 25 to 30 per cent or greater. Moreover, the tray construction of the invention has an equally high reversal area and vapor downflow area corresponding to the annular area in existing bubble cap tray design. These large areas which the trays of this invention thus afford result in low pressure drop of vapor flow through the tray which is particularly advantageous in vacuum fractionation. The aforesaid areas are directly related to the dimensions of the tray sections. The larger the sections, the simpler is the design thereof and the less the weight. However, larger sections give rise to smaller slot area, riser area, reversal area, and vapor downflow area, the latter being equivalent to annular area in conventional bubble cap design. With reference to Figure 16, the broad and preferred dimensions of the present tray sections are set forth below:

| Dimension | Broad Range (inches) | Preferred Range (inches) |
| --- | --- | --- |
| A | 2 to 8 | 3 to 5. |
| B | 1 to 6 | 2 to 4. |
| C | ½ to 3 | 1 to 2. |
| D | ½ to 2 | about 1. |
| E | 1 to 5 | 2 to 3. |
| F | 1 to 5 | 1½ to 3. |

The above-indicated preferred range offers the optimum design as regards simplicity, strength, and performance.

Construction and mounting of fractionating trays in accordance with this invention has proved advantageous in that each of the members making up the tray serves as a structural beam extending transversely across the tank so that it thereby becomes possible to construct the trays of a light corrosive-resistant metal at lower cost than other known constructions. The cross-section of the troughs making up the present trays gives an inertia moment such that the thickness of the metal plate used in tray construction may be reduced up to 50 per cent as compared with conventional bubble type trays. Independently from reduction in thickness, the weight of the present tray is less than that of a conventional tray as it has no chimney, caps, cap risers or beams. Thus, a tray of the present invention constructed for a 13' diameter fractionating tower required about 1320 pounds of steel whereas a conventional alloy tray with chimneys and caps of the same diameter required about 2200 pounds of steel, representing an increase in steel consumption of approximately 67 per cent. The described arrangement of a series of troughs and overhanging L-shaped sections forming a bubbling device which in itself is a structural member of the tray, together with interlocking end closure plates, is further advantageous from an operating point of view. For example, it has been found that, with the fractionating tray construction of this invention, a tray can be designed for not more than ⅛-inch deflection in a 9-foot span, using 16-gage stainless steel and that said tray weighs less than 10 pounds per square foot. This advantage, resulting in reduced tray weight, contributes to reducing its initial cost to as much as 50 per cent of that of other alloy fractionating trays currently being employed. The fractionating tray herein described, composed of a number of sections which vary in dimension only lengthwise, can be made from one set of dies. The co-planar arrangement of trough sections in accordance with the instant invention results in simplified installation and fabrication. Thus, a minimum of initial fabrication work is required because of standardization. Moreover, as a result of the simplicity of the design, considerably less installation and maintenance labor is required. Each section is capable of being fabricated, installed, and supported individually and has structural properties independent of the other sections of such magnitude as to require no support beams except in very large diameter fractionators. There is, in addition, the advantage that the end closure plates and intermediate stiffening plates can be readily standardized and also there is a minimum number of different parts which can be stamped out and formed on a mass production basis. Also, the provision of tray manways necessary in conventional bubble trays is not required in the present trays since access between decks for maintenance or repair can easily be gained by simply removing a few sections of the interlocking troughs. Also, in conventional bubble trays, certain sections of the slot portion of the caps are proximate to other slotted portions and there is undesirable interference with a resultant degree of inefficiency. In the present tray design, there can be no such interference since each row of slots or serrations is isolated from the others.

Thus, the design of the present fractionating tray has many mechanical advantages and at the same time brings about equal slot submergence because of the action of the vapors on the liquid travelling across the tray. The vapor stream being contacted issues in the same direction as liquid flow across the tray and the action of the vapors serves to move the liquid across each tray and thereby compensates for the hydraulic gradient.

While there has been described various preferred embodiments of the present invention, it will be understood that the invention is not limited in scope to the specific details of construction illustrated and described but that the same is subject to considerable variation without departing from the underlying features of the invention as expressed in the claims set forth below.

I claim:

1. A lightweight tray for use in a fractionating tower, comprising a plurality of trough-like members across which liquid is adapted to flow, said members serving as structural beams extending transversely across the tower in a direction substantially perpendicular to the line of liquid flow and a plurality of angular plates positioned at either end of said members, the walls of said plates respectively effecting end closure of said members and being contiguous with and affixed to trough walls of adjacent members, said members thereby being interlocked one into the other by engagement of said contiguous plate and trough walls.

2. In a fractionating tower comprising an elongated tank, a plurality of support rings affixed to the inner periphery of said tank and a plurality of elements for effecting fractionation supported on said rings at various levels within said tank, the improvement wherein said elements comprise a series of interlocking troughs across which liquid is adapted to flow, said troughs extending transversely across said tank in a direction substantially perpendicular to the line of liquid flow, each of the troughs making up said series having angular plates positioned at either end thereof, the walls of said plates respectively effecting at least partial end closure of said troughs as well as space therebetween and being contiguous with and affixed to adjacent trough walls, thereby providing engagement of said contiguous plate and trough walls and interlocking assembly of the troughs.

3. A lightweight tray for use in a fractionating tower, comprising a plurality of trough-like members which serve as structural beams extending transversely across the tower, a plurality of angular plates positioned at either end of said members and a plurality of intermediate stiffening plates, the walls of said angular plates respectively effecting end closure of said members and being contingous with and affixed to trough walls of adjacent members, adjacent members being interlocked one into the other by engagement of said contiguous plate and trough walls, said members further being strengthened against deflection by said stiffening plates which extend at predetermined intervals perpendicularly across space intermediate the trough portion of adjacent members.

4. A lightweight tray for use in a fractionating tower, comprising a plurality of troughs spaced at uniform intervals transversely across the tower and arranged in co-planar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, walls of which respectively effect end closure of space between downstream trough walls and adjacent upstream trough walls and afford support to said upstream walls by being continuous therewith and affixed thereto, a second plurality of angular plates, walls of which respectively effect end closure of space between upstream trough walls and adjacent vertical legs of said overhanging sections and afford support to said upstream walls by being contingous therewith and affixed thereto.

5. A lightweight tray for use in a fractionating tower, comprising a plurality of troughs spaced at uniform intervals transversely across the tower and arranged in co-planar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, walls of which respectively serve to effect end closure of space between downstream trough walls and adjacent upstream trough walls and to afford support to said troughs by being contiguous with and affixed to one of said walls, a second plurality of angular plates provided with top tabs, the walls of said plates respectively serving to effect end closure of space between upstream trough walls and adjacent vertical legs of said overhanging sections and to afford support to said upstream walls by being contiguous therewith and affixed thereto, adjacent interlocking troughs being further structurally strengthened by affixture of said top tabs to said horizontal legs of the overhanging sections.

6. A lightweight tray for use in a fractionating tower, comprising a plurality of troughs spaced at uniform intervals transversely across the tower and arranged in co-planar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, walls of which respectively serve to effect end closure of space between downstream trough walls and adjacent upstream trough walls and afford support to said troughs by being contingous with and affixed to one of said walls, a second plurality of angular plates, the walls of which respectively serve to effect end closure of space between upstream trough walls and adjacent vertical legs of said overhanging sections and afford support to said upstream walls by being contiguous therewith and affixed thereto, a plurality of intermediate stiffening plates which respectively extend at predetermined intervals perpendicularly across space intermediate downstream trough walls and adjacent upstream trough walls and space intermediate upstream trough walls and adjacent vertical legs of said overhanging sections, thereby serving to further structurally strengthen the trough walls against deflection.

7. A lightweight tray for use in a fractionating tower, comprising a plurality of troughs spaced at uniform intervals transversely across the tower and arranged in co-planar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, walls of which respectively serve to effect end closure of space between downstream trough walls and adjacent upstream trough walls and afford support to said upstream trough walls by being contingous therewith and affixed thereto, a second plurality of angular plates provided with top tabs, the walls of said plates respectively serving to effect end closure of space intermediate upstream trough walls and adjacent vertical legs of said overhanging sections and to afford support to said upstream walls by being contiguous therewith and affixed thereto, and a plurality of U-shaped stiffening plates, interlocking troughs being structurally strengthened against deflection by affixture of said top tabs to said horizontal legs of the overhanging sections and by said stiffening plates which respectively extend at predetermined intervals across space intermediate downstream trough walls and adjacent upstream trough walls and across space intermediate upstream trough walls and adjacent vertical legs of the overhanging sections.

8. A lightweight tray for use in a fractionating tower comprising a plurality of troughs spaced at uniform intervals transversely across the tower and arranged in co-planar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, the walls of which respectively serve to effect end closure of space between downstream trough walls and adjacent upstream trough walls and afford support to said upstream trough walls by being contiguous therewith and affixed thereto, a second plurality of angular plates provided with top tabs, the walls of said plates respectively serving to effect end closure of space intermediate upstream trough walls and adjacent vertical legs of said overhanging sections and to afford support to said upstream walls by being contiguous therewith and affixed thereto and a plurality of U-shaped stiffening plates, at least a portion of said stiffening plates being provided with top tabs, interlocking troughs being structurally strengthened against deflection by affixture of the top tabs of said angular plates to said horizontal legs of the overhanging sections and by said stiffening plates which respectively extend at predetermined intervals across space intermediate downstream trough walls and adjacent upstream trough walls and across space intermediate upstream trough walls and adjacent vertical legs of the overhanging sections, the top tabs of said stiffening plates being affixed to the horizontal legs of said overhanging sections.

9. A lightweight tray for use in a fractionating tower, comprising a plurality of troughs spaced at uniform intervals transversely across the tower and arranged in coplanar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, the walls of which respectively effect end closure of space between downstream trough walls and adjacent upstream trough walls and afford support to said walls by being affixed thereto and contiguous therewith, a second plurality of angular plates, the walls of which respectively effect end closure of space between upstream trough walls and adjacent vertical legs of said overhanging sections and afford support to said upstream walls by being contiguous therewith and affixed thereto.

10. A lightweight tray for use in a fractionating tower, comprising a plurality of troughs spaced at uniform intervals transversely across the tower and arranged in coplanar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of angular plates, the walls of which respectively serve to effect end closure of space between downstream trough walls and adjacent upstream trough walls and afford support to said downstream trough walls by being contiguous therewith and affixed thereto, a second plurality of angular plates, the walls of which respectively serve to effect end closure of space intermediate upstream trough walls and adjacent vertical legs of said overhanging sections and to afford support to said upstream walls by being contiguous therewith and affixed thereto and a plurality of angular stiffening plates which respectively extend at predetermined intervals across space intermediate downstream trough walls and adjacent upstream walls and across space intermediate upstream trough walls and adjacent vertical legs of the overhanging sections, thereby serving to structurally strengthening the trough walls against deflection.

References Cited in the file of this patent
UNITED STATES PATENTS

| | | |
|---|---|---|
| 829,700 | Drees | Aug. 28, 1906 |
| 1,822,323 | Stover | Sept. 8, 1931 |

FOREIGN PATENTS

| | | |
|---|---|---|
| 839,695 | France | Apr. 7, 1939 |